(12) United States Patent
Nania

(10) Patent No.: US 11,643,151 B2
(45) Date of Patent: May 9, 2023

(54) TAILGATE ASSEMBLY HAVING A REMOVEABLE DOOR

(71) Applicant: Ford Global Technologies, LLC, Dearborn, MI (US)

(72) Inventor: Adrian Nania, Rochester, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 184 days.

(21) Appl. No.: 17/103,517

(22) Filed: Nov. 24, 2020

(65) Prior Publication Data

US 2022/0161869 A1 May 26, 2022

(51) Int. Cl.
*B62D 33/027* (2006.01)
*B62D 33/03* (2006.01)
*B62D 33/033* (2006.01)
*B60R 3/02* (2006.01)

(52) U.S. Cl.
CPC ............ *B62D 33/0273* (2013.01); *B60R 3/02* (2013.01); *B62D 33/033* (2013.01)

(58) Field of Classification Search
CPC .. B62D 33/0273; B62D 33/03; B62D 33/027; B62D 33/02733; B62D 33/033; B60R 3/02
See application file for complete search history.

(56) References Cited

U.S. PATENT DOCUMENTS

| | | | |
|---|---|---|---|
| 6,464,276 B1 | 10/2002 | Gruich | |
| 6,742,826 B2 * | 6/2004 | Humphrey | B62D 33/0273 296/57.1 |
| 6,749,246 B2 * | 6/2004 | Landwehr | B62D 33/0273 296/61 |
| 6,905,157 B2 * | 6/2005 | Kang | B62D 33/0273 296/57.1 |
| 7,165,800 B2 * | 1/2007 | Thiele | B62D 33/037 296/57.1 |
| 7,712,811 B2 * | 5/2010 | Heaman | B62D 33/0273 296/62 |
| 8,201,869 B1 * | 6/2012 | Butlin, Jr. | B60R 3/02 296/57.1 |

(Continued)

FOREIGN PATENT DOCUMENTS

DE 102005035109 * 2/2007 ............... B60R 3/02

OTHER PUBLICATIONS

U.S. Appl. No. 16/918,335, filed Jul. 1, 2020.

*Primary Examiner* — Gregory A Blankenship
(74) *Attorney, Agent, or Firm* — Vichit Chea; Carlson, Gaskey & Olds, P.C.

(57) ABSTRACT

A tailgate assembly includes, among other things, a frame sub-assembly that includes a driver side section, a passenger side section, and a sill coupling the driver side section to the passenger side section. A door sub-assembly is disposed between the driver side section and the passenger side section. The door sub-assembly and the frame sub-assembly are pivotable together about a first axis between a tailgate closed position and a tailgate open position. The door sub-assembly is pivotable relative to the frame sub-assembly about a first door axis between a door closed position and a door open position. The door sub-assembly is pivotable relative to the frame sub-assembly about a second door axis that is different than the first door axis.

19 Claims, 5 Drawing Sheets

(56) References Cited

U.S. PATENT DOCUMENTS

| | | | | |
|---|---|---|---|---|
| 8,246,098 B2* | 8/2012 | Cheung | ............. | B62D 33/0273 |
| | | | | 296/146.12 |
| 8,348,325 B2* | 1/2013 | Hausler | ............. | B62D 33/0273 |
| | | | | 296/62 |
| 8,740,279 B1* | 6/2014 | McGoff | ............. | B62D 33/0273 |
| | | | | 49/168 |
| 8,919,853 B2* | 12/2014 | Krishnan | .................. | B60R 3/02 |
| | | | | 296/62 |
| 9,463,746 B2* | 10/2016 | Butlin, Jr. | ............. | B62D 33/03 |
| 9,517,711 B2* | 12/2016 | Krajenke | ................ | B60N 3/023 |
| 9,522,621 B2* | 12/2016 | Krajenke | ............. | B60N 3/023 |
| 9,623,807 B2 | 4/2017 | Singleton | | |
| 9,950,750 B2* | 4/2018 | Babbage | ............ | B62D 33/0273 |
| 9,988,103 B1* | 6/2018 | Mouch | ............... | B62D 33/0273 |
| 9,994,263 B1* | 6/2018 | Richter | ................... | B60P 1/435 |
| 10,308,291 B2* | 6/2019 | Seki | ....................... | B62D 33/03 |
| 10,740,796 B2 | 8/2020 | Brubaker | | |
| 10,927,581 B2* | 2/2021 | Nania | ................... | E05F 15/614 |
| 10,994,660 B2* | 5/2021 | Ngo | ................... | B62D 33/0273 |
| 11,208,157 B2* | 12/2021 | Borkar | ................ | B62D 33/037 |
| 11,325,451 B2* | 5/2022 | Nania | ................ | B62D 33/0273 |
| 11,505,261 B2* | 11/2022 | Van Norman | ....... | B62D 33/037 |
| 2009/0183433 A1* | 7/2009 | Cheung | ............. | B62D 33/0273 |
| | | | | 49/169 |
| 2012/0126564 A1* | 5/2012 | Hausler | ............. | B62D 33/0273 |
| | | | | 296/57.1 |
| 2016/0311355 A1* | 10/2016 | Krajenke | ........... | B62D 33/0273 |
| 2021/0221448 A1* | 7/2021 | Hung | ................ | B62D 33/0273 |
| 2021/0380175 A1* | 12/2021 | Jarjoura | .................... | B60R 3/02 |
| 2021/0403097 A1* | 12/2021 | Gase | ..................... | E05F 15/605 |
| 2022/0097608 A1* | 3/2022 | Patterson | ........... | B62D 33/0273 |
| 2022/0161869 A1* | 5/2022 | Nania | ................ | B62D 33/0273 |
| 2022/0227209 A1* | 7/2022 | Nania | ..................... | B60J 5/108 |

\* cited by examiner

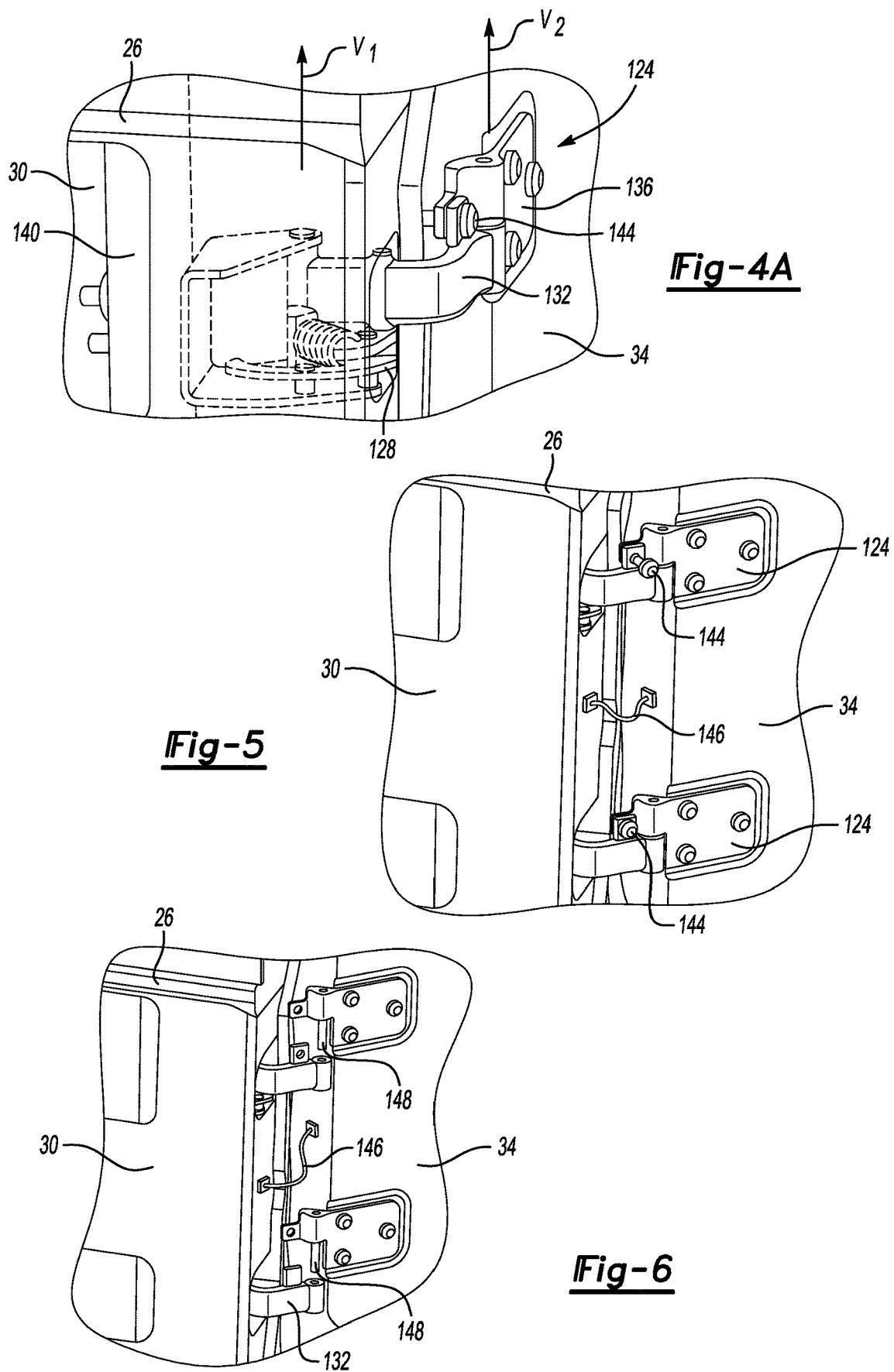

TAILGATE ASSEMBLY HAVING A REMOVEABLE DOOR

TECHNICAL FIELD

This disclosure relates generally to a tailgate assembly for a vehicle and, more particularly, a tailgate assembly that has removeable door.

BACKGROUND

Vehicles, such as pickup trucks, include a cargo bed. A tailgate assembly can enclose one end of the cargo bed when the tailgate assembly is in the closed position. The tailgate assembly can pivot to the open position where the tailgate assembly is substantially horizontal and aligned with a floor of the cargo bed.

SUMMARY

A tailgate assembly for a vehicle according to an exemplary aspect of the present disclosure includes, among other things, a frame sub-assembly that includes a driver side section, a passenger side section, and a sill coupling the driver side section to the passenger side section. A door sub-assembly is disposed between the driver side section and the passenger side section. The door sub-assembly and the frame sub-assembly are pivotable together about a first axis between a tailgate closed position and a tailgate open position. The door sub-assembly is pivotable relative to the frame sub-assembly about a first door axis between a door closed position and a door open position. The door sub-assembly is pivotable relative to the frame sub-assembly about a second door axis that is different than the first door axis.

In another example of the foregoing assembly, the first door axis and the second door axis are vertically extending and are parallel to each other.

Another example of any of the foregoing assemblies includes at least one hinge assembly that pivotably couples the door sub-assembly to the frame sub-assembly. The at least one hinge assembly includes a frame bracket directly connected to the frame sub-assembly. A door bracket is directly connected to the door sub-assembly. A connection member is coupled to the frame bracket and the door bracket.

In another example of any of the foregoing assemblies, the connection member is pivotably coupled to the frame bracket to permit pivoting of the connection member relative to the frame bracket about the first door axis. The connection member is pivotably coupled to the door bracket to permit pivoting of the door bracket relative to the connection member about the second door axis.

Another example of any of the foregoing assemblies includes at least one fastener that secures the connection member to the door bracket to block pivoting of the door bracket relative to the connection member about the second door axis.

In another example of any of the foregoing assemblies, the at least one fastener is a threaded fastener that extends through an aperture in the connection member to threadably engage the door bracket when the at least one fastener is blocking pivoting of the door bracket relative to the connection member.

Another example of any of the foregoing assemblies includes at least one hinge support that is configured to engage with at least a portion of the at least one hinge assembly to support the door sub-assembly when the door sub-assembly is decoupled from the frame sub-assembly and in a stowed position.

In another example of any of the foregoing assemblies, the at least one hinge support is configured to receive a pin of the door sub-assembly.

In another example of any of the foregoing assemblies, the door sub-assembly is adjacent a front wall of a cargo bed of a vehicle when the door sub-assembly is in the stowed position.

Another example of any of the foregoing assemblies includes at least one latch connector configured to engage at least one latch of the door sub-assembly when the door sub-assembly is decoupled from the frame sub-assembly and in the stowed position.

In another example of any of the foregoing assemblies, the at least one hinge support and the at least one latch connector are disposed adjacent a front wall of a cargo bed of a vehicle.

Another example of any of the foregoing assemblies includes an electrical connector of the door sub-assembly. The electrical connector is configured to electrically connect to a vehicle when the door sub-assembly is decoupled from the frame sub-assembly and in the stowed position.

A hinge assembly for a tailgate assembly of a vehicle according to yet another exemplary aspect of the present disclosure includes, among other things, a frame bracket directly connected to the frame sub-assembly, a door bracket directly connected to the door sub-assembly, and a connection member coupled to the frame bracket and the door bracket. The hinge assembly is configured to pivotably couple a door sub-assembly of a tailgate assembly to a frame sub-assembly of the tailgate assembly. The hinge assembly permits the door sub-assembly to pivot relative to the frame sub-assembly about a first door axis between a door closed position and a door open position. The hinge assembly permits the door sub-assembly to pivot relative to the frame sub-assembly about a second door axis that is different than the first door axis.

In another example of any of the foregoing assemblies, the connection member is pivotably coupled to the frame bracket to permit pivoting of the connection member relative to the frame bracket about the first door axis. The connection member is pivotably coupled to the door bracket to permit pivoting of the door bracket relative to the connection member about the second door axis.

In another example of any of the foregoing assemblies, the first and second axes are each vertically extending and are parallel to each other.

Another example of any of the foregoing assemblies includes at least one fastener that secures the connection member to the door bracket to block pivoting of the door bracket relative to the connection member about the second door axis.

A tailgate door sub-assembly pivoting method according to yet another exemplary aspect of the present disclosure includes pivoting a door sub-assembly and a connection member of a hinge assembly about a first pivot axis relative to a frame sub-assembly to transition the door sub-assembly back and forth between a door open position and a door closed position. The method further includes pivoting the door sub-assembly relative to the connection member about a second pivot axis.

Another example of the foregoing method includes decoupling the door sub-assembly from the frame sub-assembly after pivoting the door sub-assembly about the second pivot axis.

Another example of any of the foregoing methods includes, after the decoupling, storing the door sub-assembly in a stowed position on a vehicle after the decoupling. The door sub-assembly is operatively coupled to the vehicle when in the stowed position.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIGS. 4 and 4A illustrate a hinge assembly coupling the door sub-assembly to other parts of the tailgate assembly.

FIG. 5 illustrates a close-up of hinge assemblies from FIG. 4 after beginning to remove the door sub-assembly from other portions of the tailgate assembly.

FIG. 6 illustrates the door sub-assembly after being removed from other portions of the tailgate assembly.

DETAILED DESCRIPTION

This disclosure details exemplary tailgate assemblies that include a door sub-assembly. The door sub-assembly can be opened to provide an access area helping a user access cargo within a cargo bed of a vehicle.

Figure 1:
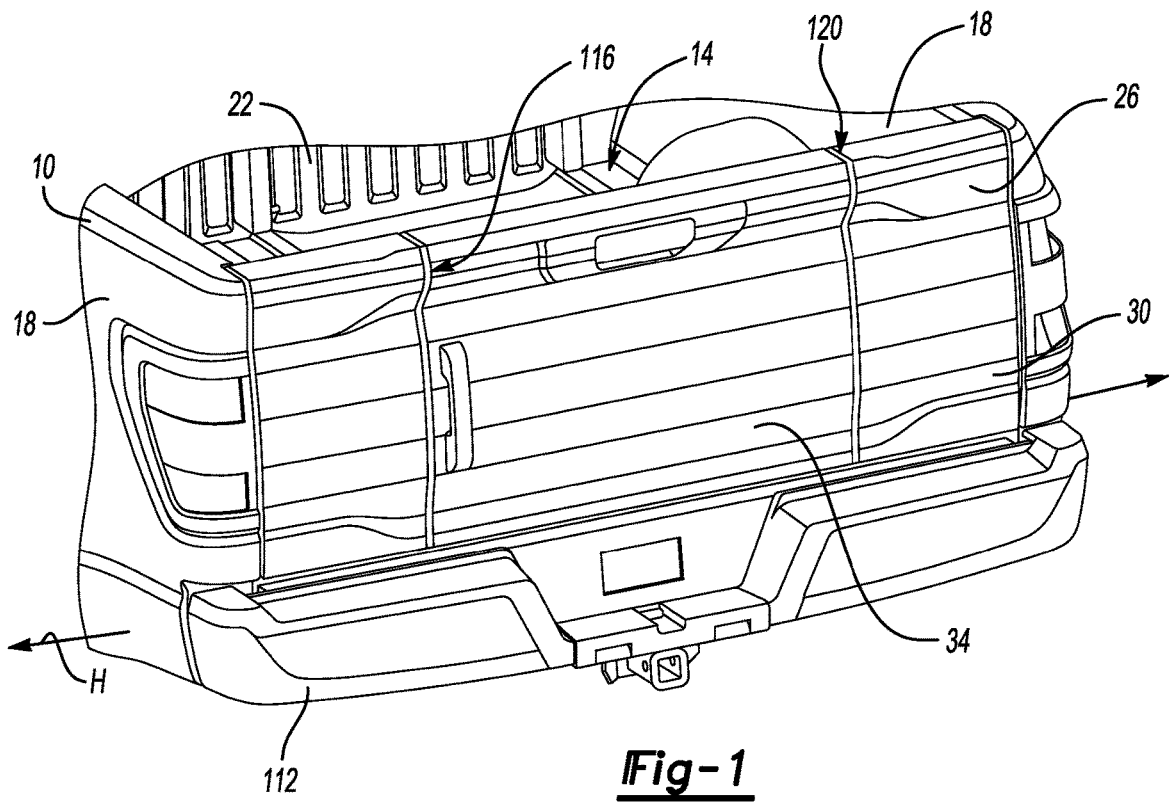
FIG. 1 illustrates a rear perspective view of a pickup truck having a cargo bed and a tailgate assembly in a tailgate closed position.

FIG. 1 illustrates a vehicle 10, here a pickup truck, having a cargo bed 14 that is defined by a pair of sidewalls 18, a front wall 22, and a tailgate assembly 26 according to an exemplary aspect of the present disclosure.

The tailgate assembly 26 includes, among other things, a frame sub-assembly 30 and a door sub-assembly 34.

Figure 2:
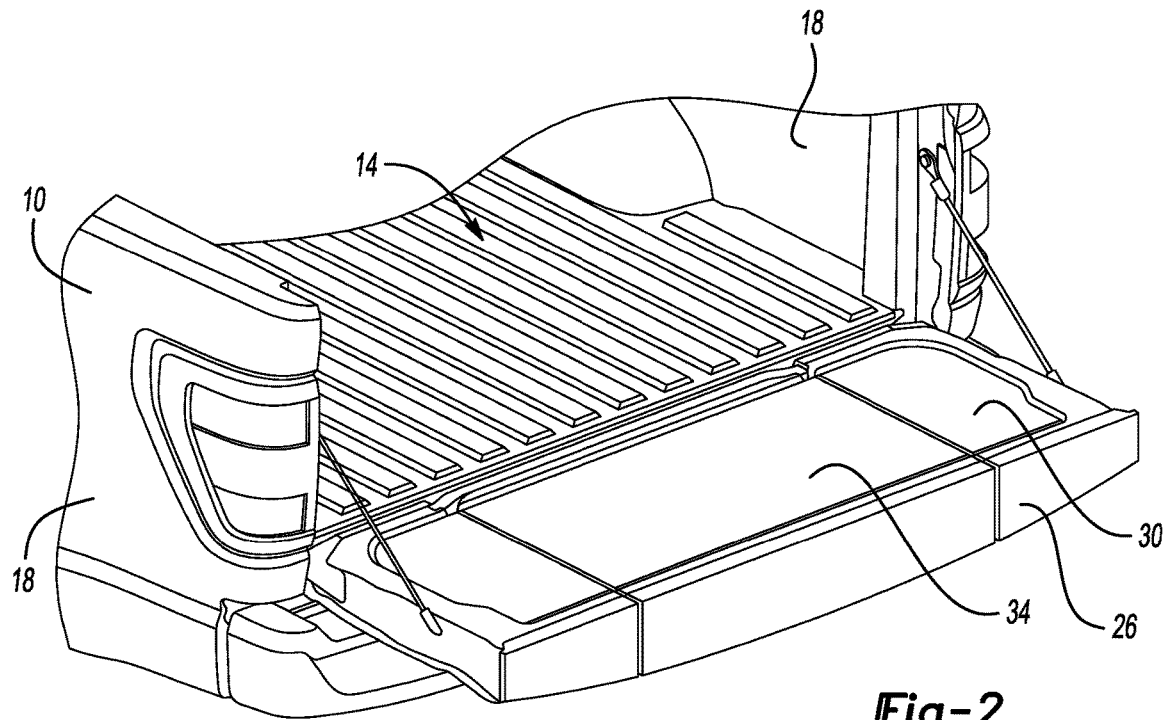
FIG. 2 illustrates a rear perspective view of the tailgate assembly in a tailgate open position.

The tailgate assembly 26 is pivotable about an axis H relative to the cargo bed 14 between a tailgate closed position shown in FIG. 1 and a tailgate open position shown in FIG. 2. The axis H extends horizontally. The example tailgate assembly 26 is vertically aligned when in the tailgate closed position and horizontally aligned when in the tailgate open position. Vertical and horizontal, for purposes of this disclosure, are with reference to ground in the ordinary orientation of the vehicle 10 during operation.

The door-sub assembly 34 is in a door closed position and is latched to the frame sub-assembly 30 when the frame sub-assembly 30 and the door sub-assembly 34 are pivoted between the tailgate closed position and the tailgate open position. Thus, the frame sub-assembly 30 and the door sub-assembly 34 pivot together when the tailgate assembly 26 are transitioned back and forth between the tailgate closed position and the tailgate open position.

Figure 3:
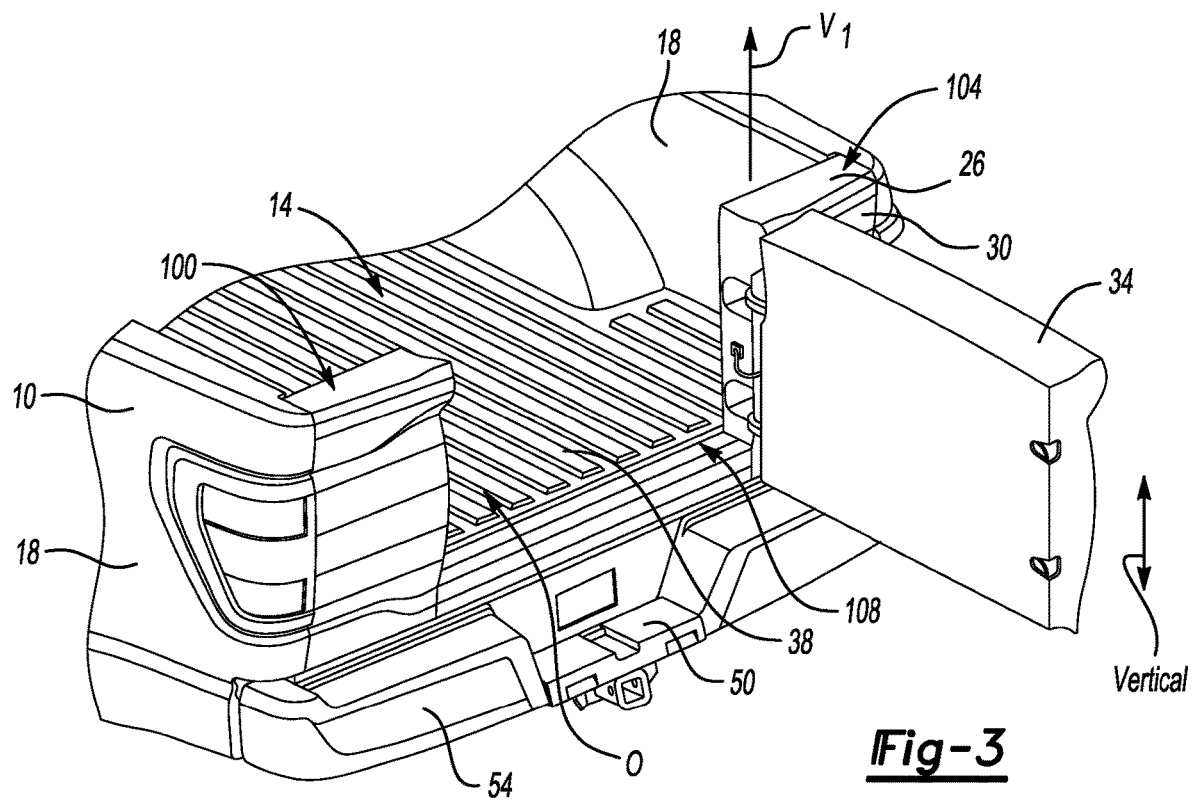
FIG. 3 illustrates a rear perspective view of the tailgate assembly of FIG. 1 with a door sub-assembly of the tailgate assembly in a door open position.

When in the tailgate closed position, the door sub-assembly 34 is pivotable relative to the frame sub-assembly 30 about an axis $V_1$ between a door closed position shown in FIG. 1 and a door open position shown in FIG. 3. The axis $V_1$ is a vertically extending axis, which is transverse horizontally extending axis H.

The door sub-assembly 34 in the door open position provides a cargo bed access opening O. In this example, the cargo bed access opening O extends vertically downward at least as far as a floor 38 of the cargo bed 14.

When the door is in the position of FIG. 3, a user can access the cargo bed 14 through the cargo bed access opening O provided by the door sub-assembly 34 in the door open position. In the exemplary embodiment, the tailgate assembly 26 with the door sub-assembly 34 simplifies the process of entering the cargo bed 14 through the cargo bed access opening O. The user does not need to choose which door (from among several doors) to open in order to enter the cargo bed 14. Further, since the door sub-assembly 34 does not extend from the sidewall 18 on the driver sidewall all the way to the sidewall 18 on the passenger side, the user can be standing behind the vehicle 10 and still be able to open the door sub-assembly 34. This can help to shield the user 42 from passing traffic, for example.

As the cargo bed access opening O extends vertically downward at least as far as the floor 38, the user has a relatively clear path to step up into the cargo bed 14 or to load cargo into the cargo bed 14. That is, the user 42 is not required to step over any elevated portion of the tailgate assembly 26 and then down onto the floor 38.

As shown in FIG. 3, the frame sub-assembly 30 of the tailgate assembly 26 includes a driver side section 100, a passenger side section 104, and a sill 108 joining the driver side section 100 to the passenger side section 104. When the tailgate assembly 26 is in the tailgate closed position of FIG. 1, the driver side section 100 and the passenger side section 104 are visible along with the door sub-assembly 34 when the vehicle 10 is viewed from the rear. The sill 108 is hidden vertically beneath a bumper 112 or fascia of the vehicle 10. The sill 108 is thus hidden from view when the tailgate assembly 26 is in the tailgate closed position.

The door sub-assembly 34 is incorporated into the tailgate assembly 26 utilizing, in this example, only two split lines 116 and 120 (FIG. 1) that extend vertically across the tailgate assembly 26. Thus, the door sub-assembly 34 is incorporated into the tailgate assembly 26 with relatively minimal aesthetic disruption.

Figure 4:
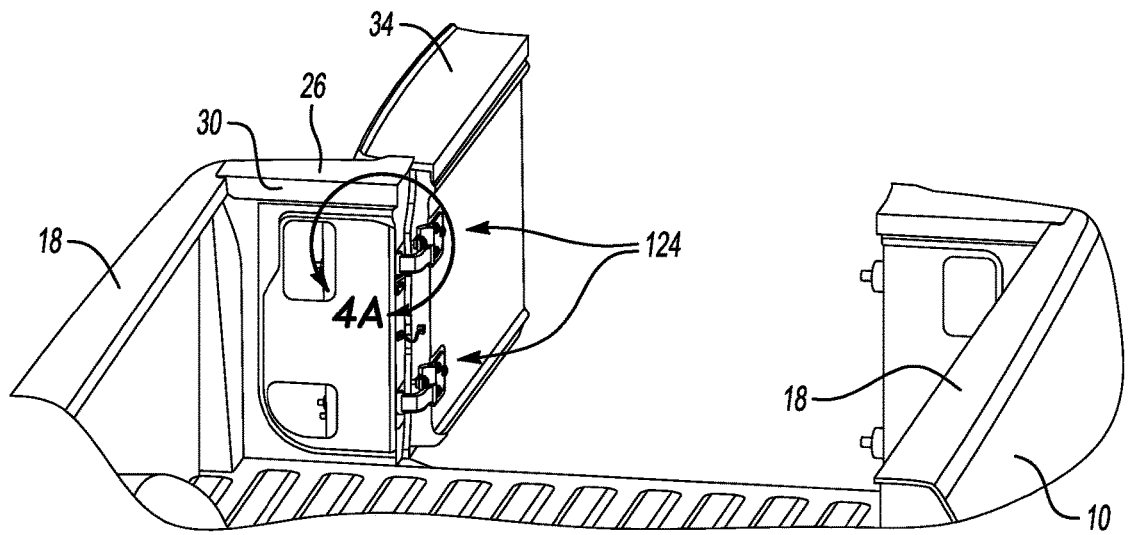

With reference to FIGS. 4 and 4A, two hinge assemblies 124 pivotably couple the door sub-assembly 34 to the frame sub-assembly 30. The hinge assemblies 124 each include a frame bracket 128, a connection member 132, and a door bracket 136. The frame brackets 128 are directly connected to a support beam 140 of the frame sub-assembly 30. The support beam 140 is a tubular support beam that extends vertically within an interior of the passenger side section 104 of the frame sub-assembly in this example. The frame brackets 128 can be attached to the support beam 140 utilizing mechanical fasteners. The door brackets 136 are directly connected to the door sub-assembly 34 using, for example, mechanical fasteners.

The example connection members 132 can be consider gooseneck members. An end portion of the connection members 132 is pivotably coupled to the respective frame bracket 128 such that the connection member 132 can pivot relative to the frame bracket 128 about the axis vi.

When the door sub-assembly 34 is pivoted relative to the frame sub-assembly 30 back and forth between the door closed position of FIG. 1 and the door open position of FIGS. 3-4A, the connection members 132 and door brackets 136 of the hinge assemblies 124 pivot about the pivot axis $V_1$ with the door sub-assembly 34. The connection members 132, door brackets 136, and door sub-assembly 34 pivot together relative to the frame bracket 128 and relative to other portions of the frame sub-assembly 30.

The hinge assemblies 124 can include checks or other features that help to hold the door sub-assembly 34 in a partially open position, a fully open position, or both. The partially open position could be 45 degrees open and the fully open position could be 90 degrees open, for example.

The other end portions of the connection members 132 are pivotably coupled to the door bracket 136. The door brackets 136 and door sub-assembly 34 can, when desired, optionally pivot relative to the connection member 132 about a pivot axis $V_2$. Like the pivot axis $V_1$, the pivot axis $V_2$ is vertically extending. The pivot axis $V_1$ is parallel to the pivot axis $V_2$.

Pivoting the door sub-assembly 34 about the pivot axis $V_2$ rather than the axis $V_1$ may be desirable to facilitate removal of the door sub-assembly 34, to increase accessibility to surfaces of the door sub-assembly 34, to accommodate certain cargo, or for some other reason.

For each hinge assembly 124, a fastener 144, here a threaded mechanical fastener, can connect together the connection member 132 and the door bracket 136. When connecting together the connection member 132 and the door bracket 136, the fastener 144 extends through an aperture in a flange of the connection member 132 to threadably engage a bore of the door bracket 136. Connecting together the connection member 132 and the door bracket 136 can prevent pivoting of the door bracket 136 relative to the connection member 132 about the axis $V_2$.

The fastener 144 is seated to connect together the connection member 132 and the door bracket 136 when pivoting the door sub-assembly 34 about the axis $V_1$ is desired. The fastener 144, when seated, also prevents the door bracket 136 from being decoupled from the connection member 132. That is, in the exemplary embodiment, the fastener 144 needs to be removed from the seated position to permit removal of the door sub-assembly 34 from the frame sub-assembly 30.

Referring to FIG. 5, a user can use a tool to disengage the fasteners 144 for each of the hinge assemblies 124 to permit removal of the door sub-assembly 34. The door sub-assembly 34 can then be lifted, which withdraws pivot pins 148 from the connection members 132, as shown in FIG. 6. After the pivot pins 148 are withdrawn, the door sub-assembly 34 is decoupled from the frame sub-assembly 30. In some examples, disconnecting an electrical connector 146 of the door sub-assembly 34 can also be required in order to remove the door sub-assembly 34. The electrical connector 146 can help to power a camera, electronic locks, lights, etc. of the door sub-assembly 34.

Figure 7:
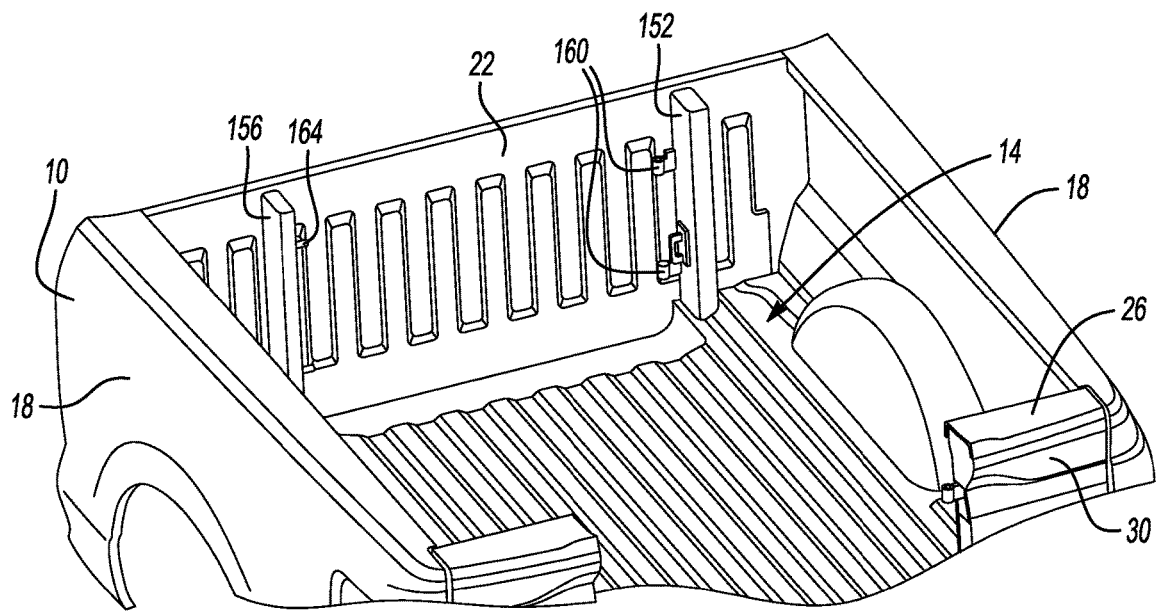
FIG. 7 illustrates the cargo area of the vehicle of FIG. 1 with the door sub-assembly removed.
Figure 8:
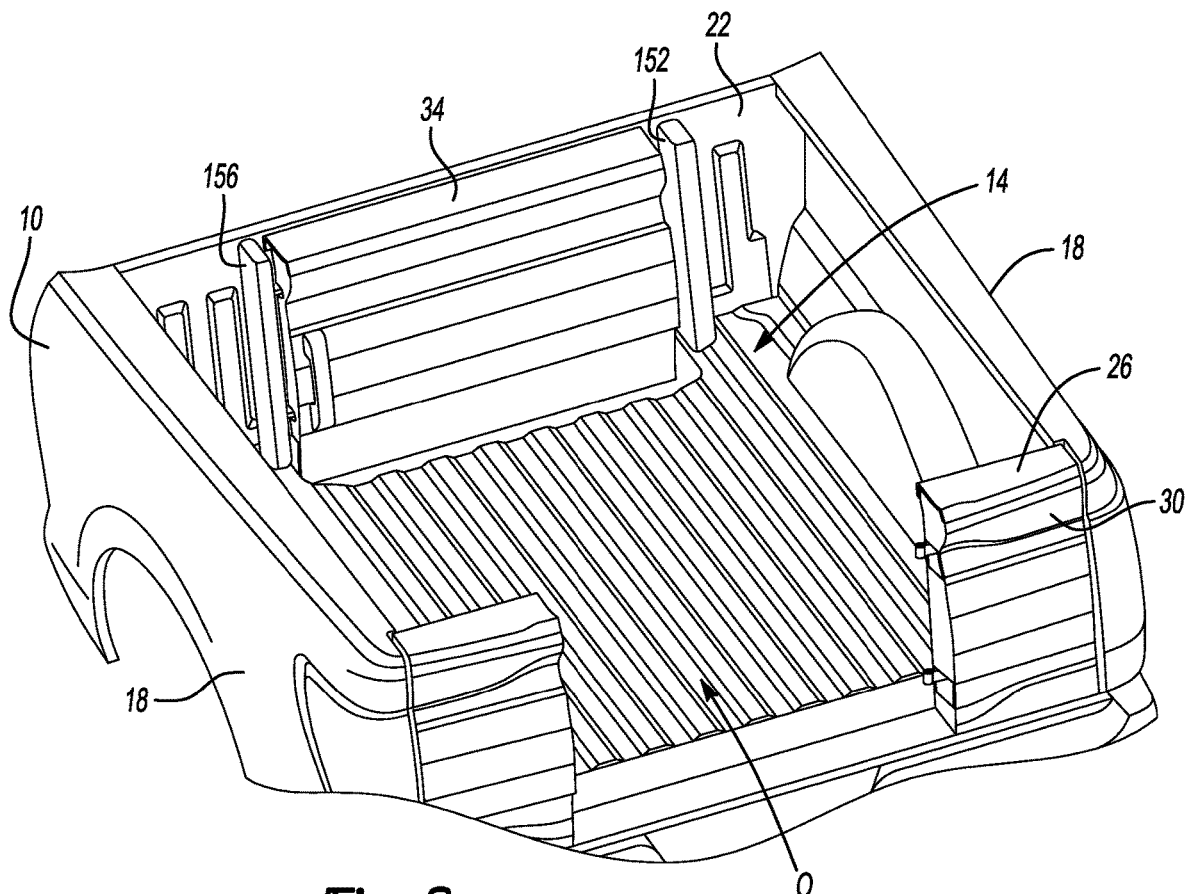
FIG. 8 illustrates the cargo area of FIG. 7 with the door sub-assembly in a stowed position.

With reference to FIGS. 7 and 8 and continuing reference to FIG. 6, a passenger side support 152 and a driver side support 156 are disposed near the front wall 22 of the cargo bed 14. The passenger side support 152 includes hinge supports 160 configured to receive the pivot pins 148 of the door brackets 136. The driver side support 156 includes latch connectors 164 configured to engage with latch sub-assemblies on a driver side of the door sub-assembly 34.

To store the door sub-assembly 34 that has been decoupled from the frame sub-assembly 30, latches of the door sub-assembly 34 can engage with the latch connectors 164 on the driver side support 156, and the hinge supports 160 can receive pins of the door brackets 136. The door sub-assembly 34 is then held by the passenger side support 152 and the driver side support 156.

The floor 38 of the cargo bed 14 can include a depression that receives part of the door sub-assembly 34 when in the stowed position of FIG. 8. The depression can help to ensure that the door sub-assembly 34 does not project too far vertically upward when in the stowed position to prevent interference with a tonneau cover, for example.

In some examples, areas between the door sub-assembly 34 and the front wall 22 are used to conceal and hold cargo. Accessing these areas requires the user to unlatch the door sub-assembly 34 from the latch connectors 164, which may require a key.

In some examples, the electrical connector 146 of the door sub-assembly 34 can electrically connect to a jumper from the vehicle 10 when the door sub-assembly 34 is in the stored position of FIG. 8. Electrical connections between the vehicle and the door sub-assembly 34 when the door sub-assembly 34 is in the stored position may facilitate the use of a camera on the door sub-assembly 34, lights on the door sub-assembly 34, or other electronic features of the door sub-assembly 34 while the door sub-assembly 34 is in the stowed position.

For example, with the door sub-assembly 34 in the stowed position of FIG. 8, the vehicle 10 may be towing a trailer. A camera of the door sub-assembly 34 can be used to capture images of the trailer and areas behind the vehicle 10 even when the door sub-assembly 34 is in the stowed position of FIG. 8. With the door sub-assembly 34 in the stowed position, the trailer may be more able to connect the vehicle 10 more easily.

Placing the door sub-assembly 34 in the stowed position of FIG. 8 provides the cargo bed access opening O within the tailgate assembly 26. A trailer attached to the vehicle 10 with a 5$^{th}$ wheel hitch or a gooseneck hitch can have greater clearance to the tailgate assembly 26 due to the cargo bed access opening O. The opening O can provide clearance to connect the trailer, for example. The opening O can also help the camera of the door sub-assembly 34 view areas behind the vehicle 10. The opening O can provide enhanced visibility for the camera in the door sub-assembly 34 and improved clearance to the trailer.

Figure 9:
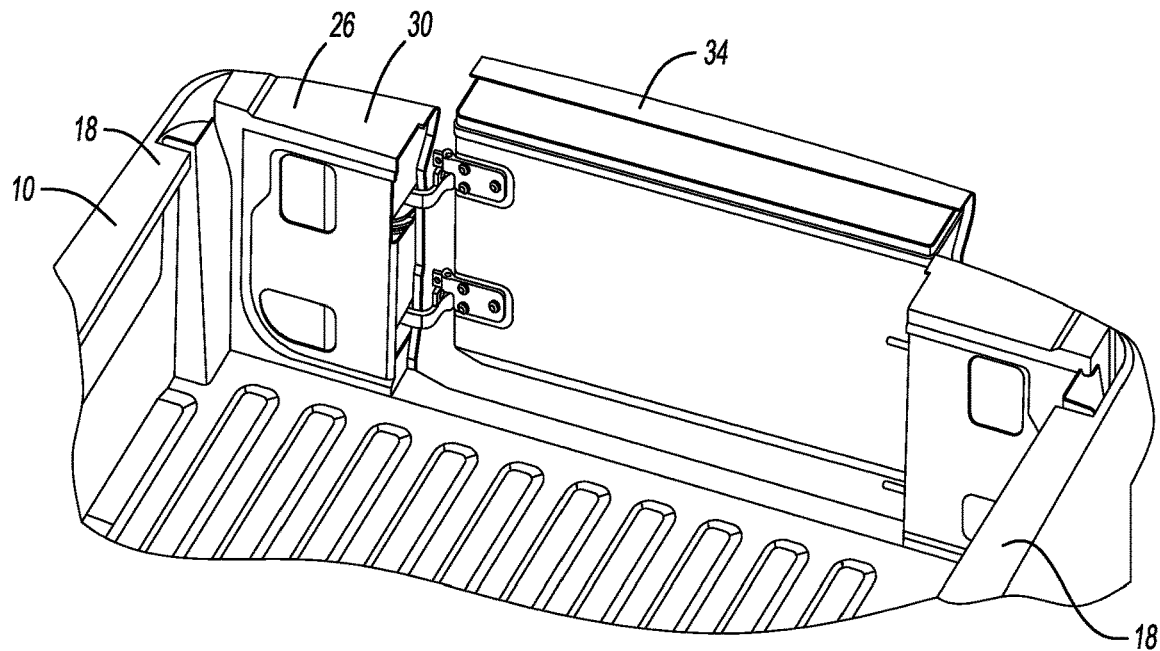
FIG. 9 illustrates the door sub-assembly pivotably coupled to other portions of the tailgate assembly and pivoted to an extended position.
Figure 10:
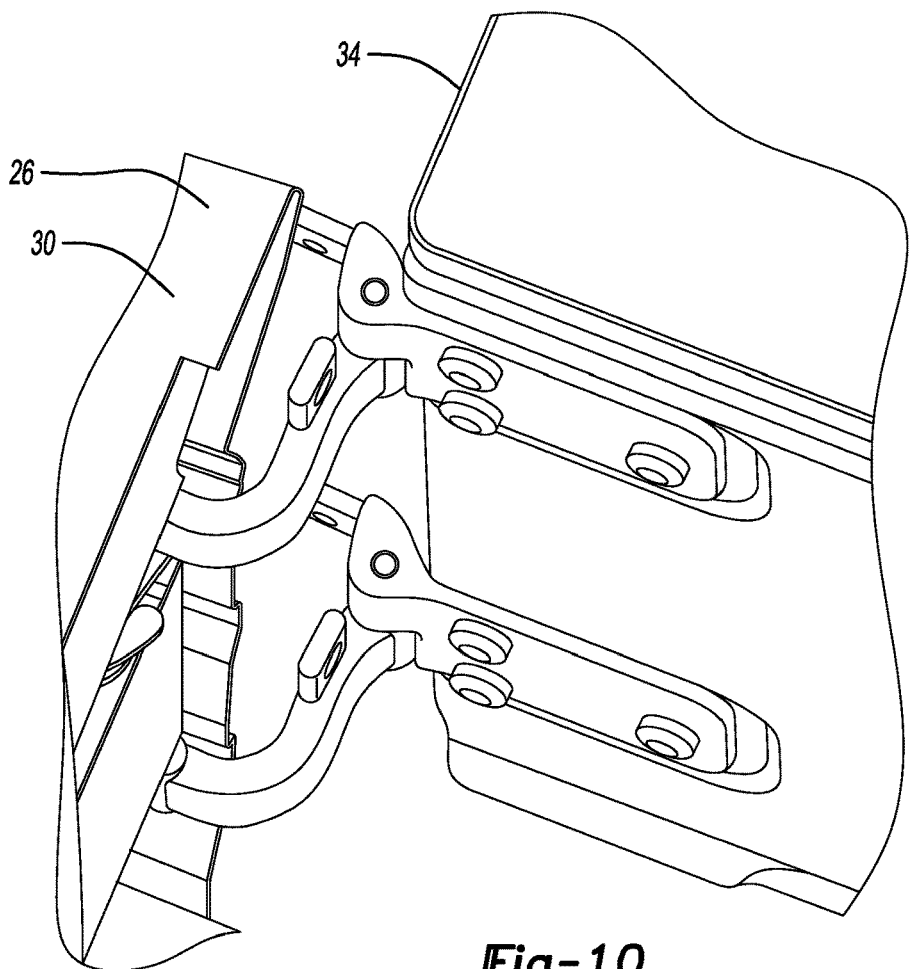
FIG. 10 shows a close-up view of the hinges when the door sub-assembly is in the extended position of FIG. 9.

While the door sub-assembly 34 is coupled to the frame sub-assembly 30, the fasteners 144 can be removed and the door sub-assembly 34 pivoted about the axis $V_2$ to the extended position shown in FIGS. 9 and 10. When the door sub-assembly 34 is in the extended position, the mechanical fasteners 144 have been removed, but the pivot pins 148 of the door brackets 136 are received within the connection members 132 to permit the door bracket 136 and the door sub-assembly 34 to pivot together about the axis $V_2$ relative to the connection member 132.

Placing the door sub-assembly 34 in the extended position may facilitate accommodating some types of cargo that is, for example, too long to fit in the cargo bed 14 when the door sub-assembly 34 is in the door closed position. Further, placing the door sub-assembly 34 in the extended position can, during a painting process, permit access to substantially all sides of the door sub-assembly 34. That is, the laterally facing surfaces of the door sub-assembly 34 can be more easily painted when the door sub-assembly 34 is in the extended position.

Some features of the disclosed examples include a tailgate assembly having a door that can be opened to facilitate access to a cargo area of the vehicle. The door is pivotably coupled via hinge assemblies that have two pivot axes. The door is typically pivoted about one of the axis when opening and closing. Pivoting the door about the other axis can facilitate decoupling of the door, for example. When decoupled, the door can be moved to a stored position on the vehicle. Some functions of the door, such as a camera, can be maintained even when the door is in the stowed position.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A tailgate assembly for a vehicle comprising:
   a frame sub-assembly that includes a driver side section, a passenger side section, and a sill coupling the driver side section to the passenger side section; and
   a door sub-assembly disposed between the driver side section and the passenger side section,
      the door sub-assembly and the frame sub-assembly pivotable together about a first axis between a tailgate closed position and a tailgate open position;
      the door sub-assembly pivotable relative to the frame sub-assembly about a first door axis between a door closed position and a door open position; and
      the door sub-assembly pivotable relative to the frame sub-assembly about a second door axis that is different than the first door axis.

2. The tailgate assembly of claim 1, wherein the first door axis and the second door axis are vertically extending and are parallel to each other.

3. The tailgate assembly of claim 1, further comprising at least one hinge assembly that pivotably couples the door sub-assembly to the frame sub-assembly, the at least one hinge assembly including a frame bracket directly connected to the frame sub-assembly, a door bracket directly connected to the door sub-assembly, and a connection member coupled to the frame bracket and the door bracket.

4. The tailgate assembly of claim 3, wherein the connection member is pivotably coupled to the frame bracket to permit pivoting of the connection member relative to the frame bracket about the first door axis, wherein the connection member is pivotably coupled to the door bracket to permit pivoting of the door bracket relative to the connection member about the second door axis.

5. The tailgate assembly of claim 4, further comprising at least one fastener that secures the connection member to the door bracket to block pivoting of the door bracket relative to the connection member about the second door axis.

6. The tailgate assembly of claim 5, wherein the at least one fastener is a threaded fastener that extends through an aperture in the connection member to threadably engage the door bracket when the at least one fastener is blocking pivoting of the door bracket relative to the connection member.

7. The tailgate assembly of claim 3, further comprising at least one hinge support configured to engaged with at least a portion of the at least one hinge assembly to support the door sub-assembly when the door sub-assembly is decoupled from the frame sub-assembly and in a stowed position.

8. The tailgate assembly of claim 7, wherein the at least one hinge support is configured to receive a pin of the door sub-assembly.

9. The tailgate assembly of claim 7, wherein the door sub-assembly is adjacent a front wall of a cargo bed of a vehicle when the door sub-assembly is in the stowed position.

10. The tailgate assembly of claim 7, further comprising at least one latch connector configured to engage at least one latch of the door sub-assembly when the door sub-assembly is decoupled from the frame sub-assembly and in the stowed position.

11. The tailgate assembly of claim 10, wherein the at least one hinge support and the at least one latch connector are disposed adjacent a front wall of a cargo bed of a vehicle.

12. The tailgate assembly of claim 7, further comprising an electrical connector of the door sub-assembly, the electrical connector configured to electrically connect to a vehicle when the door sub-assembly is decoupled from the frame sub-assembly and in the stowed position.

13. A hinge assembly for a tailgate assembly of a vehicle, comprising:
   a frame bracket directly connected to a frame sub-assembly of a tailgate assembly;
   a door bracket directly connected to a door sub-assembly of the tailgate assembly; and
   a connection member coupled to the frame bracket and the door bracket,
   the hinge assembly configured to pivotably couple the door sub-assembly of the tailgate assembly to the frame sub-assembly of the tailgate assembly, the hinge assembly permitting the door sub-assembly to pivot relative to the frame sub-assembly about a first door axis between a door closed position and a door open position, the hinge assembly permitting the door sub-assembly to pivot relative to the frame sub-assembly about a second door axis that is different than the first door axis.

14. The hinge assembly of claim 13, wherein the connection member is pivotably coupled to the frame bracket to permit pivoting of the connection member relative to the frame bracket about the first door axis, wherein the connection member is pivotably coupled to the door bracket to permit pivoting of the door bracket relative to the connection member about the second door axis.

15. The hinge assembly of claim 13, wherein the first and second door axes are each vertically extending and are parallel to each other.

16. The hinge assembly of claim 13, further comprising at least one fastener that secures the connection member to the door bracket to block pivoting of the door bracket relative to the connection member about the second door axis.

17. A tailgate door sub-assembly pivoting method, comprising:
   pivoting a door sub-assembly and a connection member of a hinge assembly about a first pivot axis relative to a frame sub-assembly to transition the door sub-assembly back and forth between a door open position and a door closed position; and
   pivoting the door sub-assembly relative to the connection member about a second pivot axis, the first pivot axis and the second pivot axis are both vertically extending pivot axes.

18. The tailgate door sub-assembly pivoting method of claim 17, further comprising decoupling the door sub-assembly from the frame sub-assembly after pivoting the door sub-assembly about the second pivot axis.

19. The tailgate door sub-assembly pivoting method of claim 18, further comprising, after the decoupling, storing the door sub-assembly in a stowed position on a vehicle after the decoupling, the door sub-assembly operatively coupled to the vehicle when in the stowed position.

* * * * *